United States Patent
Thrift et al.

(10) Patent No.: US 6,367,850 B1
(45) Date of Patent: Apr. 9, 2002

(54) FITTING ASSEMBLY FOR FLUID AND VAPOR CONNECTION

(75) Inventors: Charles D. Thrift, Farmington Hills, MI (US); Darren Meacham, Deltona, FL (US)

(73) Assignee: TI Group Automotive Systems, LLC, Warren, MI (US)

( * ) Notice: Subject to any disclaimer, the term of this patent is extended or adjusted under 35 U.S.C. 154(b) by 0 days.

(21) Appl. No.: 09/385,898

(22) Filed: Aug. 30, 1999

(51) Int. Cl.[7] ................................................ F16L 13/14
(52) U.S. Cl. ................. 285/382; 285/382.5; 285/382.2; 285/322; 285/222; 285/918
(58) Field of Search ............................. 285/382, 322, 285/382.5, 382.2, 222, 918

(56) References Cited

U.S. PATENT DOCUMENTS

| 340,801 A | * | 4/1886 | Maule ........................ 285/331 |
| 3,754,781 A | * | 8/1973 | Conroy ....................... 285/322 |
| 3,784,235 A | * | 1/1974 | Kessler et al. ................ 285/21 |
| 3,827,727 A | | 8/1974 | Moebius |
| 3,831,954 A | * | 8/1974 | Longfellow ................. 277/207 |
| 3,876,454 A | * | 4/1975 | Snell et al. .................. 428/336 |
| 3,893,720 A | | 7/1975 | Moebius |
| 4,026,006 A | | 5/1977 | Moebius |
| 4,588,215 A | * | 5/1986 | Moxham ................. 285/382.2 |
| 4,693,502 A | * | 9/1987 | Oetiker ..................... 285/334.5 |
| 4,844,517 A | | 7/1989 | Beiley et al. |
| 4,850,621 A | * | 7/1989 | Umehara ..................... 285/322 |
| 4,858,968 A | | 8/1989 | Moebius |
| 4,880,260 A | | 11/1989 | Gotoh et al. |
| 5,181,752 A | | 1/1993 | Benson et al. |
| 5,219,186 A | | 6/1993 | Hosseinian et al. |
| 5,303,958 A | | 4/1994 | Hyatt et al. |
| 5,452,921 A | | 9/1995 | Hyatt et al. |
| 6,039,361 A | * | 3/2000 | Meli ..................... 285/148.19 |

FOREIGN PATENT DOCUMENTS

| DE | 0434908 A | * 10/1926 | ................. 285/382 |
| DE | 1801294 A | * 5/1970 | ................. 285/382 |

* cited by examiner

Primary Examiner—B. Dayoan
Assistant Examiner—Carlos Lugo
(74) Attorney, Agent, or Firm—Jenner & Block, LLC

(57) ABSTRACT

A fitting assembly for fluid and vapor connection comprising a first tube, a second tube and a ring. The first tube has a male member at the end of the first tube and a radially enlarged upset formed at a distance from the end of the first tube. The second tube has a hollow female body formed at the end of the second tube. The male member is received in the female body. The ring surrounds the female body. The ring has an axial bore with an innermost diameter smaller than the outermost diameter of the female body for deforming the female body radially inward. The innermost diameter of the axial bore is smaller than at least a portion of the upset of the first tube.

25 Claims, 3 Drawing Sheets

FITTING ASSEMBLY FOR FLUID AND VAPOR CONNECTION

BACKGROUND OF THE INVENTION

This invention relates to fluid and vapor line systems which include fittings, and more particularly, to a fitting having an axially movable swaging ring.

For the automotive and other industries, fittings are commonly used to connect metal tubes and pipes to each other to provide a fluid or vapor connection.

One type of fittings often used is a ring having a conical bore for securing a male member formed at the end of a first tube inserted into a radially enlarged female body formed at the end of a second tube. For this type of fitting, the ring is loosely and slidably mounted on the first tube. The ring is mounted such that the enlarged diameter portion of the conical bore is directed toward the male member. To provide the fluid or vapor connection, the male member is first inserted into the female body. The ring is then slid along the first tube toward the female body and swaged over the female body with the male member inserted within. The swaging of the ring over the female body crushes the female body radially inward and creates a sealing surface between the female body and the male member. Once the ring is swaged over the female body, it retains the male member within the female body. The ring constantly applies a radially inward force to the female body. The female body reacts by applying a radially inward force to the male member. This radially inward force by the female body onto the male member prevents the male member from withdrawing from the female body, thus securing the male member within the female body. This type of fitting is prevalent in the art, and has proven effective in many fluid or vapor line applications.

Nevertheless, such fittings have occasionally been prone to failure. During insertion of the male member into the female body, the male member may not have been inserted sufficiently into the female body. Thus, when the ring is swaged over the female body, there is not sufficient surface between the crushed female body and the relational male member to form an effective sealing surface. Furthermore, if the male member has not been inserted sufficiently into the female body, upon swaging the ring over the female body the ring can bypass the portion of the female body overlaying the male member. Should such a situation occur, there is no radially inward force applied by the female body onto the male member, thus allowing the male member to be easily withdrawn from the female body.

While the swaging of the ring over the female body creates a sealing surface between the female body and the male member, the surface is still prone to leak should a gap develop between the female body and the male member.

One solution disclosed in prior art references is to apply a bonding agent onto the male member just prior to insertion of the male member into the female member. Examples of such bonding agents include solder and anaerobic. After insertion of the male member into the female body, the bonding agent bonds the outer surface of the male member to the inner surface of the female body. The bonding agent thus fills any gaps developed between the female body and the male member. However, the bonding agent must be applied just prior to insertion of the male member into the female body. Should the bonding agent be applied in advance, contaminants will adhere to the outer surface of the bonding agent. This lack of ability to apply the bonding agent in advance increases complexity and labor for the final assembly manufacturer's assembly plant.

Another disadvantage of this type of fitting is the need to install the ring onto the tube forming the male member just prior to the insertion of the male member into the female body. Since the ring is loosely and slidably mounted, the ring can slide off the end of the male member or up the tube away from the male member, thus preassembly of the ring onto the tube is not feasible. This lack of feasibility for preassembly of the ring increases complexity and labor for the final assembly manufacturer's assembly plant.

SUMMARY OF THE INVENTION

The present invention is directed to a fitting assembly for fluid and vapor connection comprising a first tube, a second tube and a ring. The first tube has a male member at the end of the first tube and a radially enlarged upset formed at a distance from the end of the first tube. The second tube has a hollow female body formed at the end of the second tube. The male member is received in the female body. The ring surrounds the female body. The ring has an axial bore with an innermost diameter smaller than the outermost diameter of the female body for deforming the female body radially inward. The innermost diameter of the axial bore is smaller than at least a portion of the upset of the first tube.

DETAILED DESCRIPTION OF THE INVENTION

Figure 1:
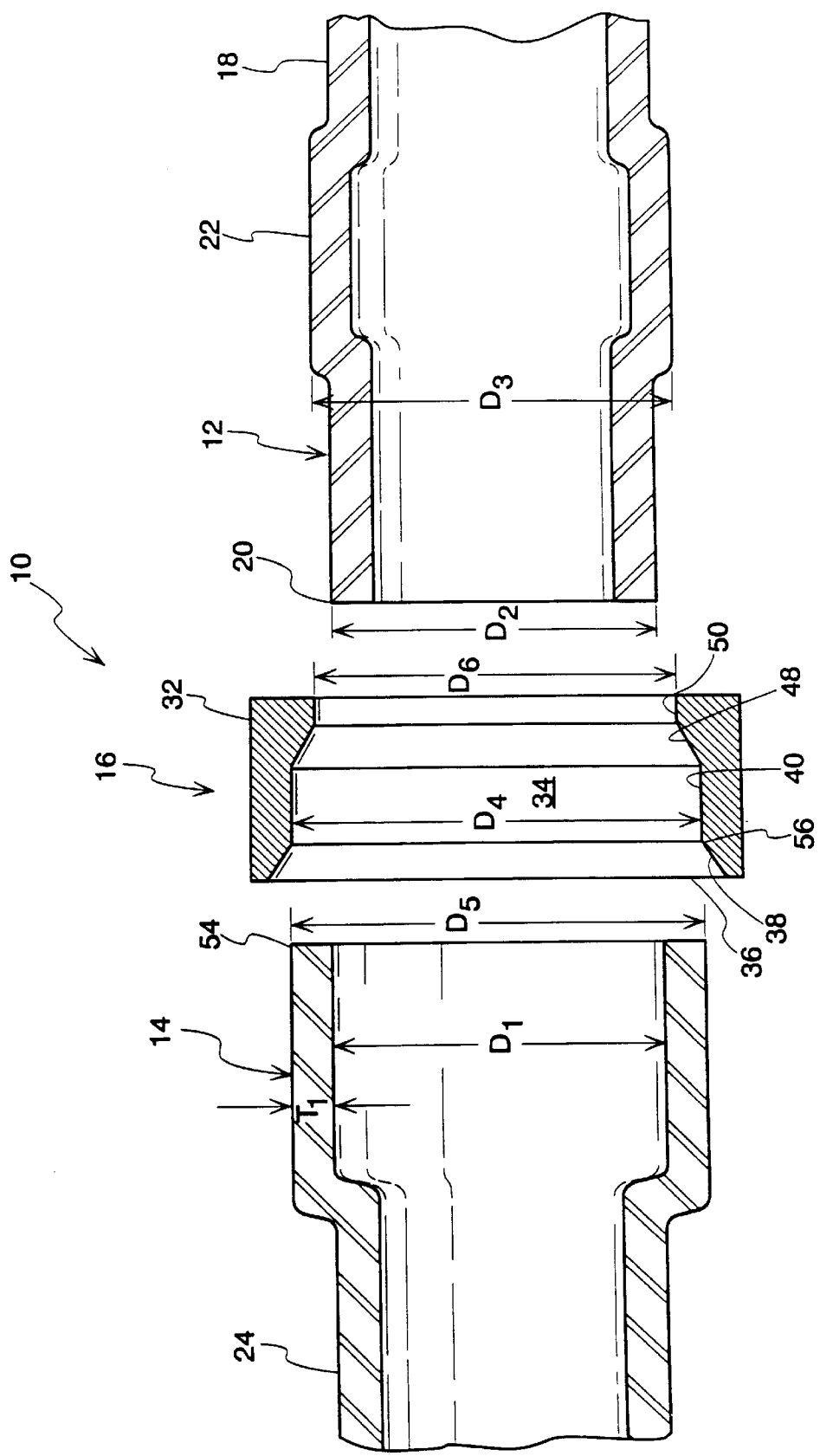
FIG. 1 is a sectional view of a first embodiment of a fitting assembly prior to assembly.
Figure 2:
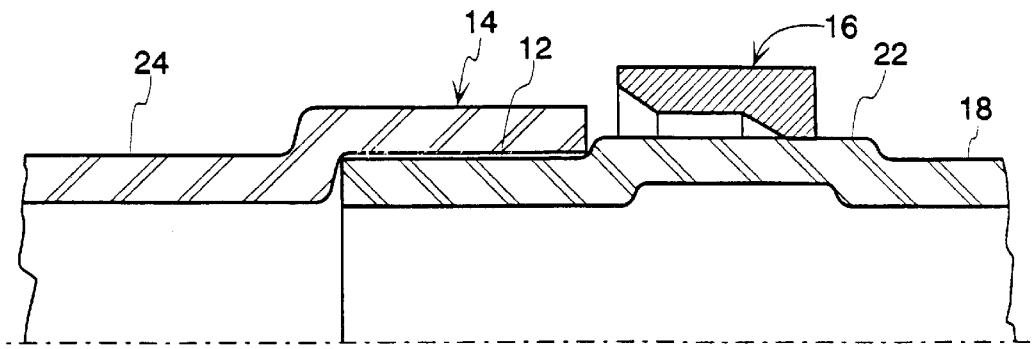
FIG. 2 is a partial section view of the fitting assembly of FIG. 1 after a ring is preassembled onto an upset and a male member is inserted into a female body.
Figure 3:
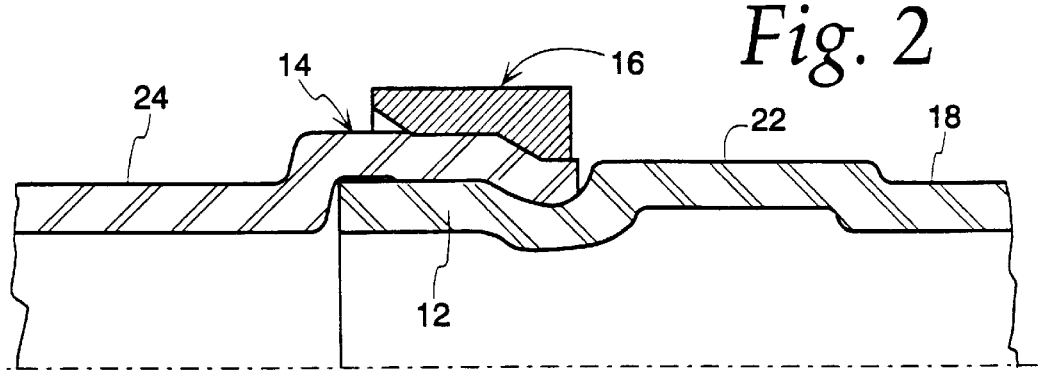
FIG. 3 is a partial sectional view of the fitting assembly of FIG. 1 after the ring is swaged over the female body.

FIGS. 1–3 illustrate a first embodiment of a fitting assembly of the present invention. The fitting assembly 10 comprises a male member 12, a female body 14 and a ring 16.

The male member 12 is formed at the end of a first hollow and rigid tube 18 which forms a part of a fluid line system. The tube 18 may lead to a component in a fluid line system, or may itself be a portion of a component in a fluid line system. Formed at a given distance from the distal end 20 of the male member 12 is a radially enlarged upset 22. The upset 22 is situated between the male member 12 and the remaining portion of the first tube 18.

The female body 14 is formed at the end of a second hollow and rigid tube 24 which forms the other part of a fluid line system. The female body 14 is enlarged radially in relation to the remaining portion of the second tube 24. The length of the female body 14 is slightly longer than the length of the male member 12. The inner diameter $D_1$ of the female body 14 is slightly larger than the outer diameter $D_2$ of the male member 12. The inner diameter $D_1$ of the female body 14 is smaller than the outer diameter $D_3$ of the upset 22 of the first tube 18.

The ring 16 has a generally cylindrical outer surface 32. The ring 16 has an axial bore 34 extending axially inward from an entrance 36. The entrance 36 is defined by a first conical surface 38. The first conical surface 38 acts as a lead-in surface to facilitate the swaging of the ring 16 over the female body 14. Axially inward from the first conical surface 38 is a first cylindrical surface 40. The diameter $D_4$ of the first cylindrical surface 40 is sized such that the first cylindrical surface 40 will crush the female body 14 radially inward, but will not crush the male member 12. Therefore, the diameter $D_4$ of the first cylindrical surface 40 is smaller than the outer diameter $D_5$ of the female body 14, but larger than the outer diameter $D_2$ of the male member 12 plus twice the wall thickness $T_1$ of the female body 14. Axially inward from the first cylindrical surface 40 is a second conical surface 48. The second conical surface 48 acts as a lead-in surface to a second cylindrical surface 50. The diameter $D_6$ of the second cylindrical surface 50 is sized such that the second cylindrical surface 50 will crush both the female body 14 and the male member 12 radially inward. Therefore, the diameter $D_6$ of the second cylindrical surface 50 is smaller than the outer diameter $D_2$ of the male member 12 plus twice the wall thickness $T_1$ of the female body 14.

The diameter $D_6$ of the second cylindrical surface 50 also sized to be slightly smaller than a portion of the upset 22 of the first tube 18, thus creating an interference fit between the second cylindrical surface 50 and a portion of the upset 22. The upset 22 as illustrated in FIGS. 1–3 has a cylindrical surface. However, it should be noted that the upset can have a further radially enlarged surface in which only the further radially enlarged surface of the upset creates an interference fit with the second cylindrical surface. The upset can also have a conical surface such that a portion of the conical upset creates an interference fit with the second cylindrical surface.

The first embodiment of a fitting assembly 10 functions as follows. The ring 16 is preassembled onto the upset 22 of the first tube 18. The ring 16 is slid axially onto the upset 22 such that the first conical surface 38 is directed toward the distal end 20 of the male member 12. Since a portion of the upset 22 creates an interference fit with the second cylindrical surface 50 of the ring 16, the ring is retained on the upset 22. This preassembly can be performed prior to the components of the fitting assembly arriving at the final assembly manufacturer's assembly plant, thus reducing the complexity and labor required at the assembly plant.

To connect the fitting assembly 10, the male member 12 is first inserted into the female body 14 until the terminal end 54 of the female body 14 abuts the upset 22 of the male member 12. Hence, the upset 22 does not only serve as a retainer for the ring 16 during preassembly, but the upset 22 also serves as a positive stop during the insertion of the male member 12 into the female body 14. The upset 22 allows for consistency in the amount of male member 12 inserted into the female body 14.

After the male member 12 is fully inserted into the female body 14, the ring 16 is slid axially toward the female body 14. As the ring is slid over the female body 14, the first conical surface 38 contacts the terminal end 54 of the female body 14. Thereafter, the trailing end 56 of the first conical surface 38 and the first cylindrical surface 40 apply a radially inward force, crushing the female body 14 radially inward, thus creating a sealing surface between the inner surface of the female body 14 and the outer surface of the male member 12. Once the second conical surface 48 contacts the terminal end 54 of the female body 14, the second conical surface 48 and the second cylindrical surface 50 further apply a greater radially inward force, crushing both the female body 14 and the male member 12. The crushed female body 14 and male member 12, along with the constant radially inward force applied by the ring 16, prevents the withdrawal of the male member 12 from the female body 14.

Figure 4:
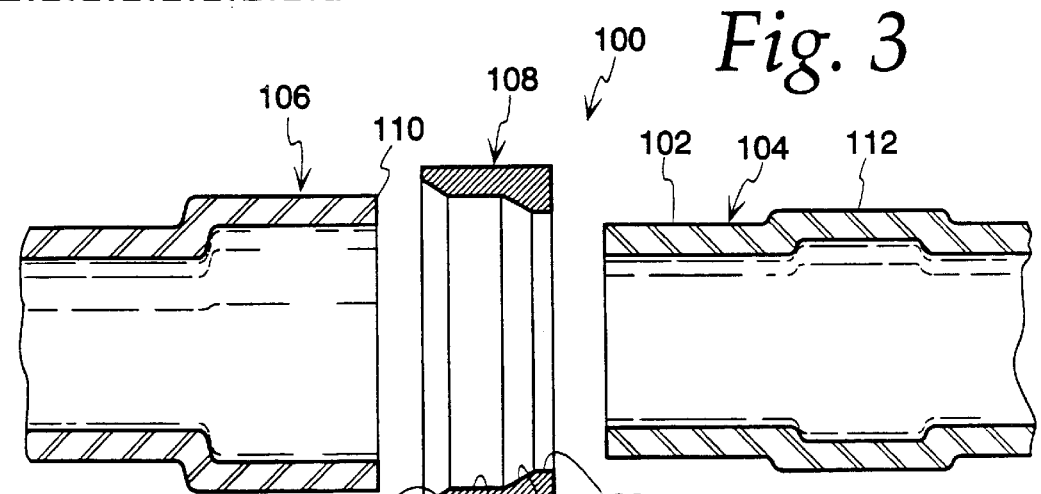
FIG. 4 is a sectional view of a second embodiment of a fitting assembly prior to assembly.
Figure 5:
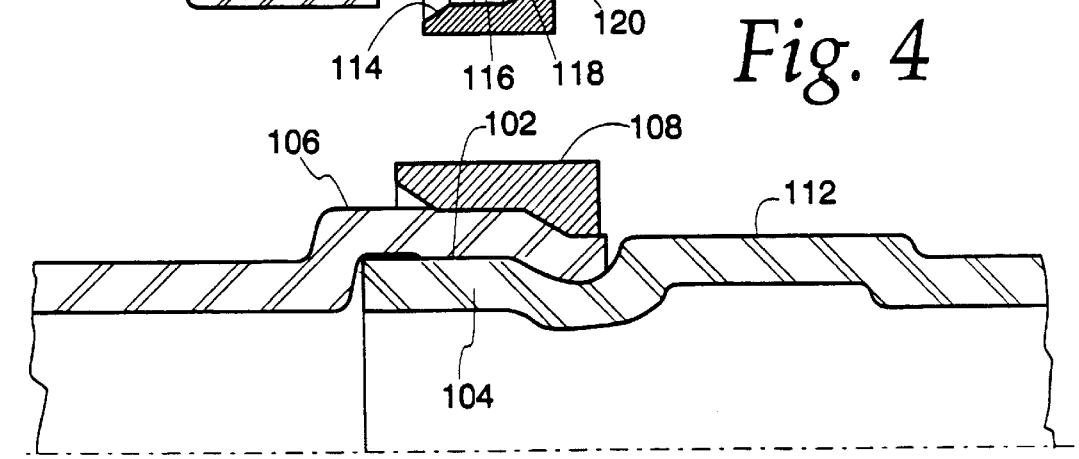
FIG. 5 is a partial sectional view of the fitting assembly of FIG. 4 after a ring is swaged over a female body.

FIGS. 4 and 5 illustrate a second embodiment of a fitting assembly 100 of the present invention. The second embodiment is the same as the first, but includes an additional sealing layer 102 surrounding a male member 104. The sealing layer 102 is a thin layer of polymeric material bonded to the male member 104, but is not bonded to a female body 106. Since the sealing layer does not have any adhesion characteristic on the outer surface, the concern of contaminants attaching to the sealing layer has been eliminated, thus the sealing layer can to be applied to the male member well before the male member 104 is inserted into the female body 106.

Suitable polymeric materials for the sealing layer 102 include, but are not limited to, elastomers, fluoropolymers, polyamides, polyesters, polyurethanes, polyvinyl chlorides, polyketones, polyolefins and mixtures thereof. The preferred polymeric material for forming the sealing layer is elastomer. The polymeric material can be applied by being painted onto the male member. A brush is used to coat the male member with the liquid form of the polymeric material onto the male member. A liquid form of the polymer material can also be extruded around the male member through use of an extruder.

Alternatively, the polymeric material can be formed into thin strips. A layer of adhesive is applied to one side of the strip. The strip of polymeric material with adhesive applied can be rolled up for storage, similar to a roll of tape. The rolled strip can later be spirally wrapped around the male member to provide a layer of polymeric material surrounding and bonded to the male member.

The strip of polymeric material is applied to the portion of the male member 104 radially inward of a swaging ring 108 after the ring 108 has been fully swaged around the female body 106.

The second embodiment of a fitting assembly 100 functions the same as the first embodiment, but provides a sealing layer which fills any gap between the male member 104 and the female body 106. A layer 102 of polymeric material is pre-applied to the outer surface of the male member 104. The male member 104 is inserted into the female body 106 until the terminal end 110 of the female body 106 abuts an upset 112 formed axially inward of the male member 104. The ring 108 is slid over the female body 106. The trailing end of a first conical surface 114 and a first cylindrical surface 116 apply a radially inward force, crushing the female body 106 radially inward. Located between the male member 104 and the female body 106 is the layer 102 of polymeric material. The radially inward force compresses the layer 102 of polymeric material tightly between the male member 104 and the female body 106 to create an effective seal.

A second conical surface 118 and a second cylindrical surface 120 then apply a greater radially inward force, crushing the female body 106 and the male member 104 radially inward to prevent the male member 104 from withdrawing from the female body 106.

Figure 6:
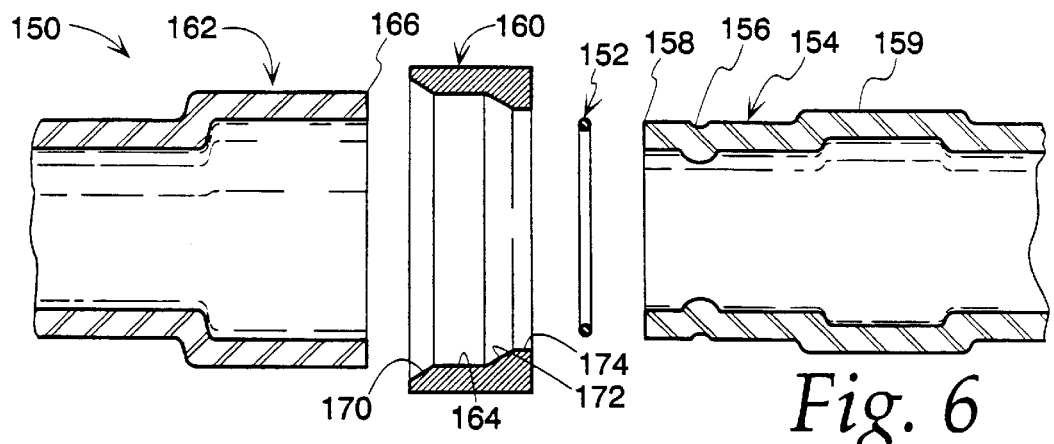
FIG. 6 is a sectional view of a third embodiment of a fitting assembly prior to assembly.
Figure 7:
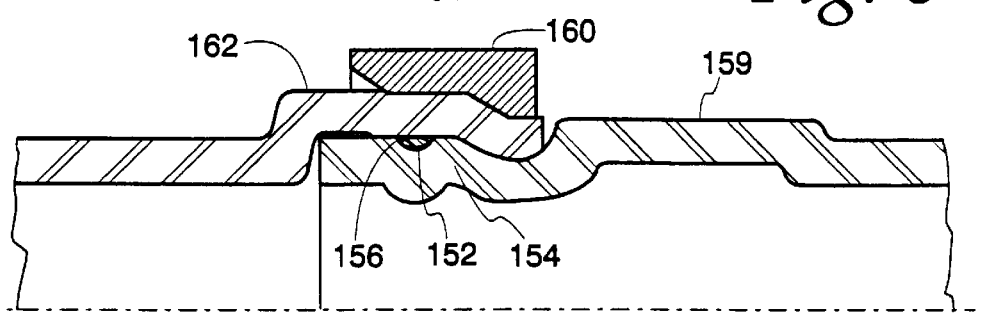
FIG. 7 is a partial sectional view of the fitting assembly of FIG. 6 after a ring is swaged over a female body.

FIGS. 6 and 7 illustrate a third embodiment of a fitting assembly 150 of the present invention. The third embodiment is the same as the first, but includes an additional O-ring 152 surrounding a male member 154. The male member 154 of the third embodiment further has a channel 156 formed between the distal end 158 of the male member and an upset 159 formed axially inward of the male member 154.

Situated in the channel 156 is the elastomeric O-ring 152. The channel 154 retains the O-ring 152 onto the male member 154 and prevents the O-ring 152 from sliding or rolling axially along the male member 154. The channel 156 is located in a portion of the male member 154 such that, after a swaging ring 160 is fully swaged around a female body 162, the portion of the female body 162 radially outward of the channel 156 is crushed radially inward, but the male member 154 is not crushed. Thus, a first cylindrical surface 164 of the ring 160 is located radially outward of the channel 156 after the ring 160 is fully waged around the female body 162.

The third embodiment of a fitting assembly 150 functions the same as the first embodiment, but provides a channel formed on the male member and an O-ring situated in the channel. The O-ring 152 is pre-installed in the channel 156. The male member 154 is inserted into the female body 162 until the terminal end 166 of the female body 162 abuts the upset 159. The ring 160 is slid over the female body 162. The trailing end of a first conical surface 170 and the first cylindrical surface 164 apply a radially inward force crushing the female body 162 radially inward. Located between the channel 156 of the male member 154 and the female body 162 is the O-ring 152. The radially inward force 152 compresses the O-ring tightly between the channel 156 of the male member 154 and the female body 162 to create an effective seal. A second conical surface 172 and a second cylindrical surface 174 then apply a greater radially inward force, crushing the female body 162 and the male member 154 radially inward to prevent the male member 154 from withdrawing from the female body 162.

Figure 8:
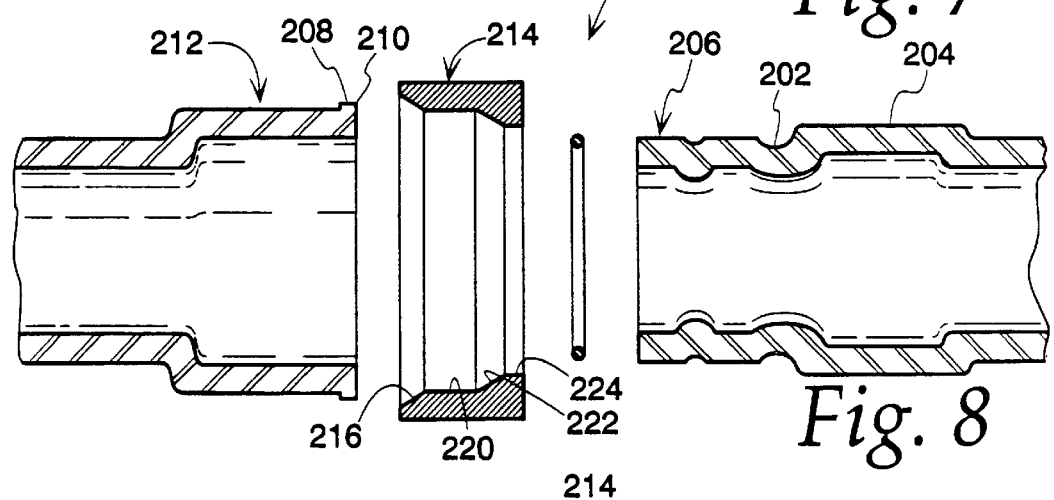
FIG. 8 is a sectional view of a fourth embodiment of a fitting assembly prior to assembly.
Figure 9:
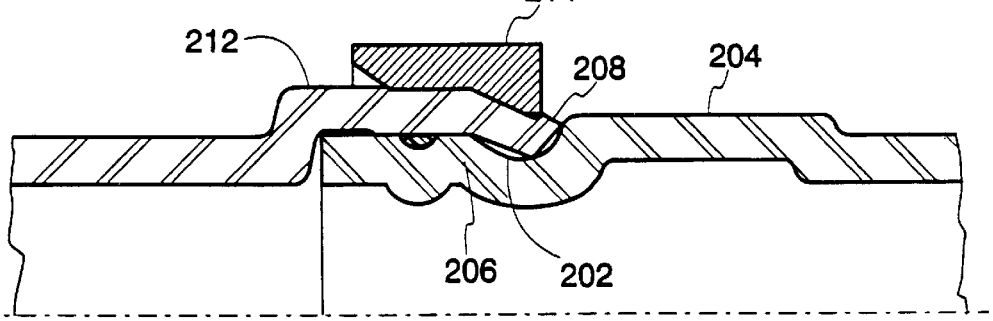
FIG. 9 is a partial sectional view of the fitting assembly of FIG. 8 after a ring is swaged over a female body.

FIGS. 8 and 9 illustrate a fourth embodiment of a fitting assembly 200 of the present invention. The fourth embodiment is the same as the third, but includes a second channel 202 adjacent to an upset 204 formed axially inwardly of a male member 206 and a radially outward protrusion 208 at the terminal end 210 of a female body 212. Upon full insertion of the male member 206 into the female body 212, the protrusion 208 is directly radially outward of the second channel 202 of the male member 206.

The fourth embodiment of a fitting assembly 200 functions the same as the first, but provides a second channel formed on the male member and a protrusion at the terminal end of the female body. The male member 206 is inserted into the female body 212 until the terminal end 210 of the female body 212 abuts the upset 204. A ring 214 is slid over the female body 212. The trailing end of a first conical surface 216 and a first cylindrical surface 220 first apply a radially inward force crushing and deforming the protrusion 208 radially inward toward the second channel 202. The trailing end 218 of the first conical surface 216 and the first cylindrical surface 220 then apply a radially inward force, crushing the remaining portion of the female body 212 radially inward. A second conical surface 222 and a second cylindrical surface 224 then apply a greater radially inward force, further crushing and deforming the protrusion 208 into the second channel 202 of the male member 206. The deformed protrusion 208 acts as an abutment surface, preventing the withdrawal of the male member 206 from the female body 212. Since the second conical surface 222 and the second cylindrical surface 224 do not crush the male member 206 radially inward, less effort is required to swage the ring 214 over the female body 212.

Various features of the present invention have been described with reference to the embodiments shown and described. It should be understood, however, that modifications may be made without departing from the spirit and scope of the invention as represented by the following claims.

What is claimed is:

1. A fitting assembly for fluid and vapor connection comprising:
   a first tube having a male member at the end of said first tube and a radially enlarged upset formed at a distance from said end of said first tube;
   a second tube having a hollow female body formed at the end of said second tube, said male ember received in said female body,
   a ring surrounding said female body, said ring having an axial bore with an innermost diameter smaller than diameter of a portion of said female body for deforming said portion of said female body radially inward, said innermost diameter of said axial bore of said ring smaller than a portion of said upset of said first tube.

2. A fitting assembly as claimed in claim 1 wherein the terminal end of said female member abuts said upset of said first tube.

3. A fitting assembly as claimed in claim 1 wherein said axial bore of said ring has a first cylindrical surface and a second cylindrical surface.

4. A fitting assembly as claimed in claim 1 further comprising a polymeric material surrounding said male member, said polymeric material unbonded to said female body and compressed between said male member and said female body.

5. A fitting assembly as claimed in claim 4 wherein said polymeric material being an O-ring.

6. A fitting assembly as claimed in claim 4 wherein said polymeric material bonded to said male member.

7. A fitting assembly as claimed in claim 6 wherein said polymeric material painted around said male member.

8. A fitting assembly as claimed in claim 6 wherein said polymeric material extruded around said male member.

9. A fitting assembly as claimed in claim 6 wherein said polymeric material being a thin strip having a layer of adhesive applied to one surface of said strip of polymeric material, said strip of polymeric material wrapped around said male member.

10. A fitting assembly as claimed in claim 6 wherein said polymeric material is selected from the group consisting of elastomers, fluoropolymers, polyamides, polyesters, polyurethanes, polyvinyl chloride, polyketones, polyolenfins and mixtures thereof.

11. A fitting assembly as claimed in claim 1 wherein said female body further having a radially extending protrusion at the distal end of said female body, said male member further having a channel radially inward from said protrusion of said female body, said ring deforms said annular protrusion radially inward into said channel.

12. A fitting assembly as claimed in claim 11 wherein said protrusion extends radially outward.

13. A fitting assembly for fluid and vapor connection comprising:
   a hollow female body having a radially extending protrusion at the distal end of said female body;

a male member received in said female body, said male member having a channel radially inward from said protrusion of said female body;

a ring surrounding said hollow female body, said ring having an axial bore with an innermost diameter smaller than diameter of said protrusion of said female body; and wherein said ring deforms said protrusion radially inward into said channel.

14. A fitting assembly as claimed in claim 13 wherein said protrusion extends radially outward.

15. A fitting assembly as claimed in claim 13 further comprising a polymeric material surrounding said male member, said polymeric material unbonded to said female body and compressed between said male member and said female body.

16. A fitting assembly as claimed in claim 15 wherein said polymeric material being an O-ring.

17. A fitting assembly as claimed in claim 15 wherein said polymeric material bonded to said male member.

18. A fitting assembly as claimed in claim 17 wherein said polymeric material painted around said male member.

19. A fitting assembly as claimed in claim 17 wherein said polymeric material extruded around said male member.

20. A fitting assembly as claimed in claim 17 wherein said polymeric material being a thin strip having a layer of adhesive applied to one surface of said strip of polymeric material, said strip of polymeric material wrapped around said male member.

21. A fitting assembly as claimed in claim 17 wherein said polymeric material is selected from the group consisting of elastomers, fluoropolymers, polyamides, polyesters, polyurethanes, polyvinyl chloride, polyketones, polyolenfins and mixtures thereof.

22. A fitting assembly for fluid and vapor connection comprising;

a hollow female body;

a male member received in said female body;

a polymeric material painted around said male member, said polymeric material unbonded to said female body; and a ring surrounding said hollow female body, said ring having an axial bore with an innermost diameter smaller than diameter of a portion of said female body for deforming said portion of said female body radially inward; and wherein said polymeric material is compressed between said male member and said female body.

23. A fitting assembly for fluid and vapor connection comprising;

a hollow female body;

a male member received in said female body;

a polymeric material extruded around said male member, said polymeric material unbonded to said female body; and a ring surrounding said hollow female body, said ring having an axial bore with an innermost diameter smaller than diameter of a portion of said female body for deforming said portion of said female body radially inward; and wherein said polymeric material is compressed between said male member and said female body.

24. A fitting assembly for fluid and vapor connection comprising;

a hollow female body;

a male member received in said female body;

a polymeric material surrounding said male member, said polymeric material being a thin strip having a layer of adhesive applied to one surface of said strip of polymeric material, said strip of polymeric material wrapped around said male member, said polymeric material unbonded to said female body; and a ring surrounding said hollow female body, said ring having an axial bore with an innermost diameter smaller than diameter of a portion of said female body for deforming said portion of said female body radially inward; and wherein said polymeric material is compressed between said male member and said female body.

25. A fitting assembly for fluid and vapor connection comprising;

a hollow female body;

a male member received in said female body;

a polymeric material surrounding said male member, said polymeric material unbonded to said female body, said polymeric material is selected from the group consisting of elastomers, fluoropolymers, polyamides, polyesters, polyurethanes, polyvinyl chloride, polyketones, polyolenfins and mixtures thereof, and a ring surrounding said hollow female body, said ring having an axial bore with an innermost diameter smaller than diameter of a portion of said female body for deforming said portion of said female body radially inward; and wherein said polymeric material is compressed between said male member and said female body.

* * * * *